US008338983B2

(12) United States Patent
Rozman et al.

(10) Patent No.: US 8,338,983 B2
(45) Date of Patent: Dec. 25, 2012

(54) SSPC FOR AC POWER DISTRIBUTION

(75) Inventors: Gregory I. Rozman, Rockford, IL (US);
Said M. Waleed, Rockford, IL (US)

(73) Assignee: Hamilton Sundstrand Corporation,
Windsor Locks, CT (US)

( * ) Notice: Subject to any disclaimer, the term of this patent is extended or adjusted under 35 U.S.C. 154(b) by 323 days.

(21) Appl. No.: 12/766,317

(22) Filed: Apr. 23, 2010

(65) Prior Publication Data

US 2011/0260534 A1 Oct. 27, 2011

(51) Int. Cl.
*H02J 3/14* (2006.01)
*H02M 1/10* (2006.01)

(52) U.S. Cl. ........... 307/29; 307/38; 307/57; 307/45; 307/32; 307/84

(58) Field of Classification Search ............ 307/29, 307/57, 34, 38
See application file for complete search history.

(56) References Cited

U.S. PATENT DOCUMENTS

| 5,654,859 | A | 8/1997 | Shi |
| 7,193,337 | B2 | 3/2007 | Nguyen |
| 7,564,147 | B2 | 7/2009 | Michalko |
| 7,589,942 | B2 | 9/2009 | Kumfer et al. |
| 2007/0263336 | A1* | 11/2007 | Shudarek ............... 361/118 |
| 2008/0217471 | A1 | 9/2008 | Liu et al. |

FOREIGN PATENT DOCUMENTS

JP 2011151950 * 1/2010

* cited by examiner

*Primary Examiner* — Rexford Barnie
*Assistant Examiner* — Toan Vu
(74) *Attorney, Agent, or Firm* — Cantor Colburn LLP

(57) ABSTRACT

A method of operating an alternating current (AC) power distribution assembly (PDA), where the ACPDA includes a plurality of AC power distribution modules, each connected to a respective AC load includes turning a first switch off and turning a second switch on in each of the AC power distribution modules; starting up each of the respective AC loads; monitoring a load current in the ACPDA and obtaining an acceptable load current in the ACPDA; determining if a set of motor sensor parameters for the ACPDA are within predetermined limits, and, in the event the motor sensor parameters are within the predetermined limits, determining if a startup period has elapsed; and in the event the startup period has elapsed, turning the first switch on and turning the second switch off in each of the AC power distribution modules.

16 Claims, 9 Drawing Sheets

US 8,338,983 B2

SSPC FOR AC POWER DISTRIBUTION

FIELD OF INVENTION

The subject matter disclosed herein generally relates to the field of solid state power controllers.

DESCRIPTION OF RELATED ART

Solid State Power Controllers (SSPCs) are used in power distribution systems in, for example, the aerospace industry, as an alternative to a traditional electromechanical circuit breaker. An SSPC may distribute power to and protect various electrical loads. In comparison to electromechanical devices, SSPCs provide relatively fast response time, and may eliminate arcing during turn-off transient and bouncing during turn-on transient. SSPCs also do not suffer severe degradation during repeated fault isolation in comparison with electromechanical devices. SSPCs may be relatively small in weight and size. SSPCs facilitate advanced protection and diagnostics, allowing for efficient power distribution architectures and packaging techniques.

BRIEF SUMMARY

According to one aspect of the invention, a method of operating an alternating current (AC) power distribution assembly (PDA), wherein the ACPDA comprises a plurality of AC power distribution modules, each connected to a respective AC load includes turning a first switch off and turning a second switch on in each of the AC power distribution modules; starting up each of the respective AC loads; monitoring a load current in the ACPDA and obtaining an acceptable load current in the ACPDA; determining if a set of motor sensor parameters for the ACPDA are within predetermined limits, and, in the event the motor sensor parameters are within the predetermined limits, determining if a startup period has elapsed; and in the event the startup period has elapsed, turning the first switch on and turning the second switch off in each of the AC power distribution modules.

According to another aspect of the invention, an alternating current (AC) power distribution assembly (PDA) includes a master AC power distribution module; and a plurality of AC power distribution modules, each connected to a respective AC load, each of the plurality of AC power distribution modules comprising a first switch and a second switch, the first switch being connected to the master AC power distribution module, and the second switch being connected to a soft start controller; wherein the first switch is turned off and the second switch is turned on during a start mode of the ACPDA.

According to another aspect of the invention, an alternating current (AC) power distribution assembly (PDA) includes a master AC power distribution module; and a plurality of AC power distribution modules, each connected to a respective AC load, each of the plurality of AC power distribution modules comprising a first switch and a second switch, the first switch being connected to the master AC power distribution module, and the second switch being connected to a filter; wherein the first switch is turned off and the second switch is turned on during a start mode of the ACPDA.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an SSPC for alternating current (AC) power distribution are provided, with exemplary embodiments being discussed below in detail. SSPC technology may be applied to an AC power distribution system, and more specifically to power distribution and protection of AC power to AC motors. An AC motor may comprise an induction machine that may draw about 6 to 8 times the motor's rated current from the AC power source during line start. This relatively high overload current may last for a time period between about 7 to about 10 seconds. During the relatively high overload current period, the SSPC may perform a start mode. The SSPC may be designed such that the SSPC supports reduction of the current rating of the main SSPC switch during the start mode, leading to a lower cost and weight of the AC power distribution assembly (PDA). The SSPC may comprise a switching device, which dissipates excessive heat at elevated current levels due to internal resistances.

Figure 1:
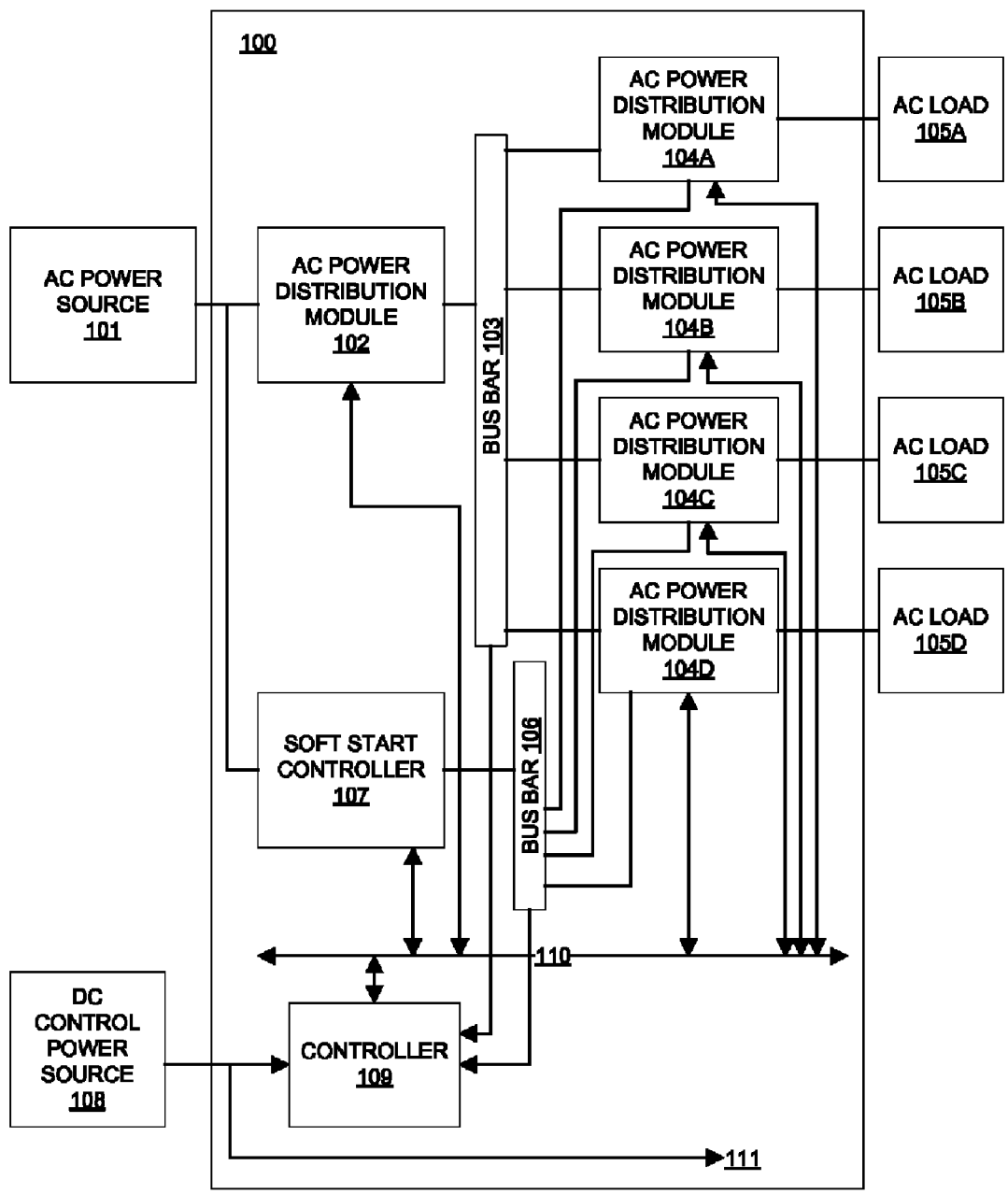
FIG. 1 illustrates an embodiment of an AC PDA comprising an SSPC.

An embodiment of an AC PDA 100 comprising an SSPC is illustrated in FIG. 1. AC PDA 100 receives AC power from AC power source 101. The line from AC power source 101 is connected to AC power distribution module 102 and soft start controller 107, which are both controlled by controller 109 via communication bus 110. Soft start controller 107 is activated by controller 109 during start mode, and is disconnected after start mode is complete. During start mode, AC power distribution module 102 is turned off, and power from AC power source 101 is sent to soft start controller 107, which starts up AC loads 105A-D via bus bar 106 and AC Power distribution modules 104A-D. Soft start controller 107 comprises an AC switch with phase control, and works in sequence to start the AC loads 105A-D, gradually increasing the voltage applied to the AC loads 105A-D via AC power distribution modules 104A-D during start mode. After start mode is complete, AC power distribution module 102 is turned on, and soft start controller 107 is turned off by controller 109. Power from AC power source 101 is then sent through AC power distribution module 102 through main power bus bar 103 to AC power distribution modules 104A-D, which power respective AC loads 105A-D. AC power distribution modules 104A-D act as breakers for their respective individual loads 105A-D, and AC power distribution module 102 acts as the master breaker for all of the loads 105A-D. DC control power source 108 powers controller 109, as well as soft start controller 107 and AC power distribution modules 102 and 104A-D via line 111. Controller 109 also acts to control AC power distribution modules 104A-D, and monitor power quality on the bus bars 103 and 106. Soft start controller 107 may comprise a variable voltage variable frequency motor controller. A synchronization block (not shown) may be present in controller 109 to insure a synchronized connection from controller 109 to the main power bus bar 103. Start mode is discussed in further detail below with respect to FIG. 7. AC Power distribution modules 104A-D and AC loads 105A-D are shown for illustrative purposes only; AC PDA 100 may comprise any appropriate number of AC power distribution modules 104 and AC loads 105.

Figure 2:
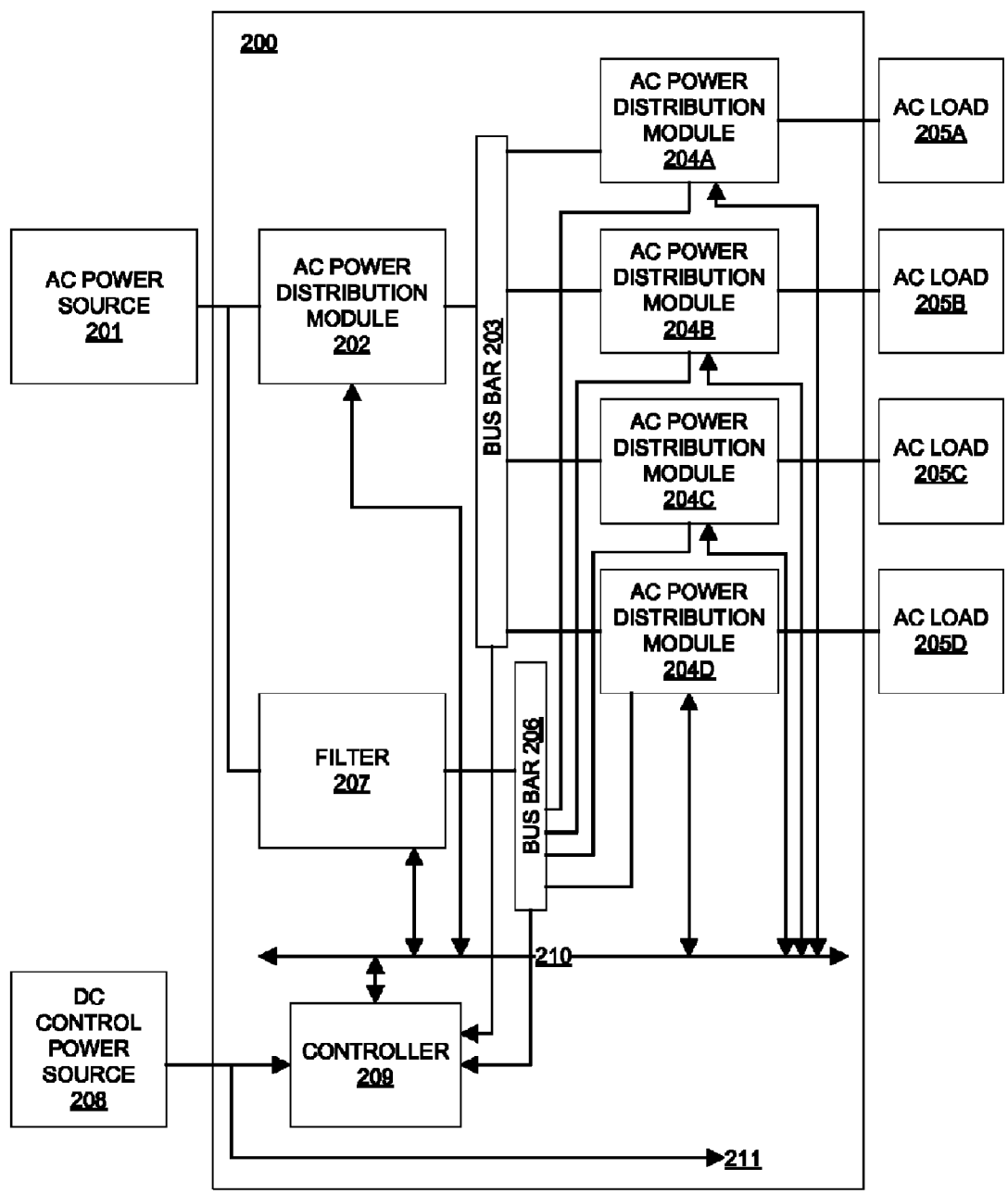
FIG. 2 illustrates an embodiment of an AC PDA comprising an SSPC.

An embodiment of an AC PDA 200 comprising an SSPC is illustrated in FIG. 2. AC PDA 200 receives AC power from AC power source 201. The line from AC power source 201 is connected to AC power distribution module 202 and filter 207. Controller 209 activates AC distribution module 202 and monitors power quality on the input of filter 207. Filter 207 is used during start mode, and is disconnected after start mode is complete. During start mode, AC power distribution module 202 is turned off, and power from AC power source 201 is sent to filter 207, which rejects harmonics created during phase control of switch 503 (discussed below with respect to FIG. 5) in each of AC power distribution modules 204A-D via bus bar 206 on AC power source output 201. After start mode is complete, AC power distribution module 202 is turned on, and filter 207 is disconnected from the AC power modules 204A-D by switch 503. Power from AC power source 201 is then sent through AC power distribution module 202 and main power bus bar 203 to AC power distribution modules 204A-D, which power respective AC loads 205A-D. AC power distribution modules 204A-D act as breakers for their respective individual loads 205A-D, and AC power distribution module 202 acts as the master breaker for all of the loads 205A-D. DC control power source 208 powers controller 209, as well as AC power distribution modules 202 and 204A-D via line 211. Controller 209 also acts to control AC power distribution modules 204A-D, and monitor power quality on the bus bars 203 and 206. Start mode is discussed in further detail below with respect to FIG. 8. AC Power distribution modules 204A-D and AC loads 205A-D are shown for illustrative purposes only; AC PDA 200 may comprise any appropriate number of AC power distribution modules and AC loads.

Figure 3:
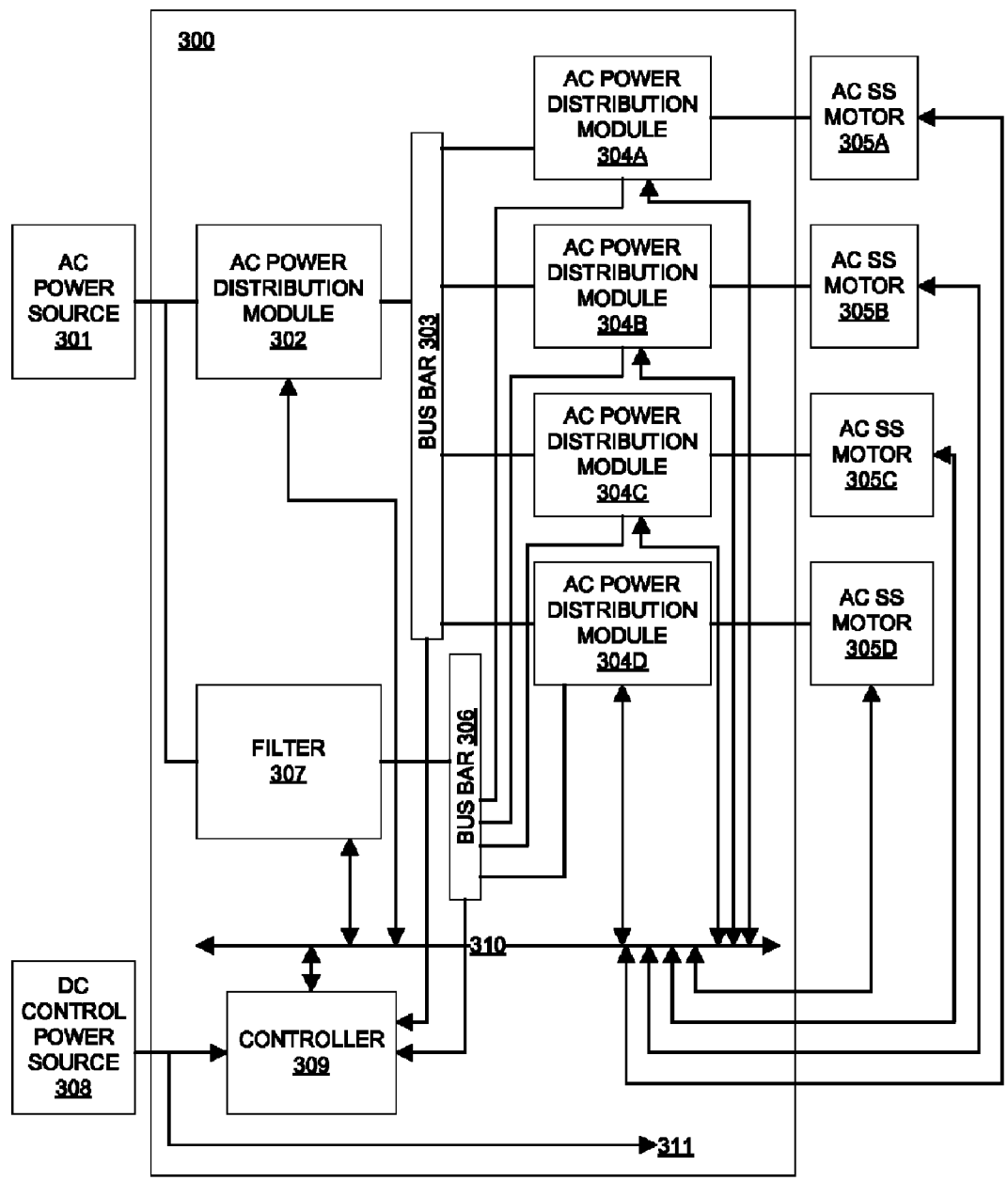
FIG. 3 illustrates an embodiment of an AC PDA comprising an SSPC.

An embodiment of an AC PDA 300 comprising an SSPC is illustrated in FIG. 3. AC PDA 300 receives AC power from AC power source 301. The line from AC power source 301 is connected to AC power distribution module 302 and filter 307. Controller 309 activates AC distribution module 302 and monitors power quality on the input of filter 307. Filter 307 is used during start mode, and is disconnected after start mode is complete. During start mode, AC power distribution module 302 is turned off, and power from AC power source 301 is sent to filter 307, which rejects harmonics created during pulse width modulation control of switch 403 (discussed below with respect to FIG. 4) of AC power distribution modules 304A-D via bus bar 306 on AC power source output 301. Each of AC power distribution modules 304A-D are connected to AC motors 305A-D comprising built in soft start controllers, which gradually increase the voltage applied to the AC soft start motors 305A-D during start mode, as is discussed below in further detail with respect to FIG. 4. After start mode is complete, AC power distribution module 302 is turned on, and filter 307 is disconnected from the AC power distribution modules 304A-D by switch 503 (discussed below with respect to FIG. 5). Power from AC power source 301 is then sent through AC power distribution module 302 through main power bus bar 303 to AC power distribution modules 304A-D, which power respective AC soft start motors 305A-D. AC power distribution modules 304A-D act as breakers for their respective individual AC soft start motors 305A-D, and AC power distribution module 302 acts as the master breaker for all of the AC soft start motors 305A-D. DC control power source 308 powers controller 309, as well as soft start controllers 305A-D and AC power distribution modules 102 and 104A-D via line 111. Controller 309 also acts to control AC power distribution modules 304A-D, AC soft start motors 305A-D, and monitors power quality on the bus bars 303 and 306. Start mode is discussed in further detail below with respect to FIG. 9. AC Power distribution modules 304A-D and AC soft start motors 305A-D are shown for illustrative purposes only; AC PDA 300 may comprise any appropriate number of AC power distribution modules and AC soft start motors.

Figure 4:
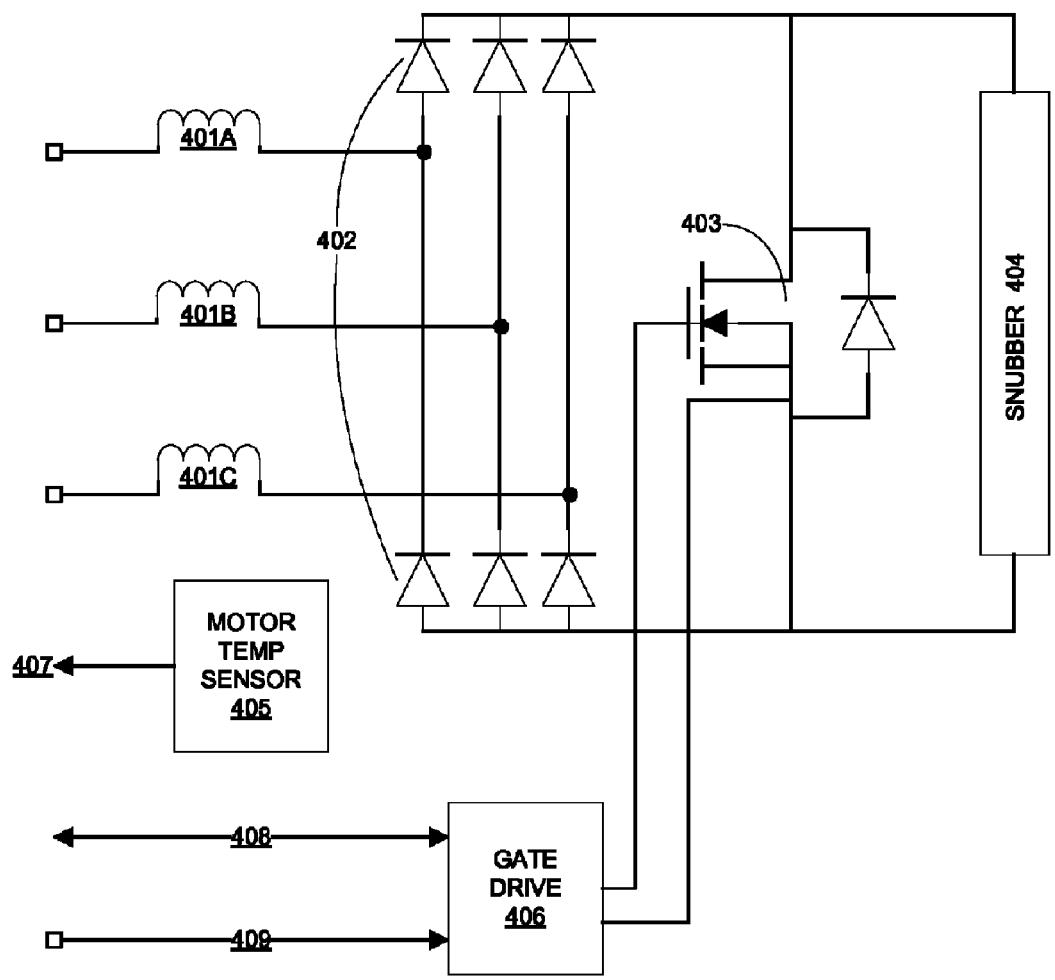
FIG. 4 illustrates an embodiment of an AC soft start motor.

The soft start for AC PDA 300 is accomplished by embedded soft start controllers in each of AC soft start motors 305A-D, which may comprise the configuration shown in AC soft start motor 400 of FIG. 4. AC soft start motor 400 comprises open ended stator windings 401A-C connected via full diode bridge 402 to power switch 403, which may comprise a metal oxide semiconductor field effect transistor (MOSFET) or an insulated gate bipolar transistor (IGBT). Switch 403 is arranged in parallel with snubber 404. Switch 403 is controlled by gate drive 406. During motor soft start the switch 403 is pulse width modulated with increased duty cycle, effectively providing variable impedance that limits inrush current. After soft start completion, the switch 403 remains closed providing effectively a neutral connection of motor stator windings 401A-C. Since the soft start modulation occurs on the other side of the motor stator windings 401A-C, the stator windings 401A-C provides filtering effect, allowing for use of a reduced size for filter 307. Gate drive 406 receives instructions from controller 309 via communication bus 310 at input 408, and is powered by DC control power connection 409, which may be connected to line 311 of FIG. 3. Motor temperature sensor 405 sends data regarding the temperature of the motor via output 407 to communication bus 310.

Figure 5:
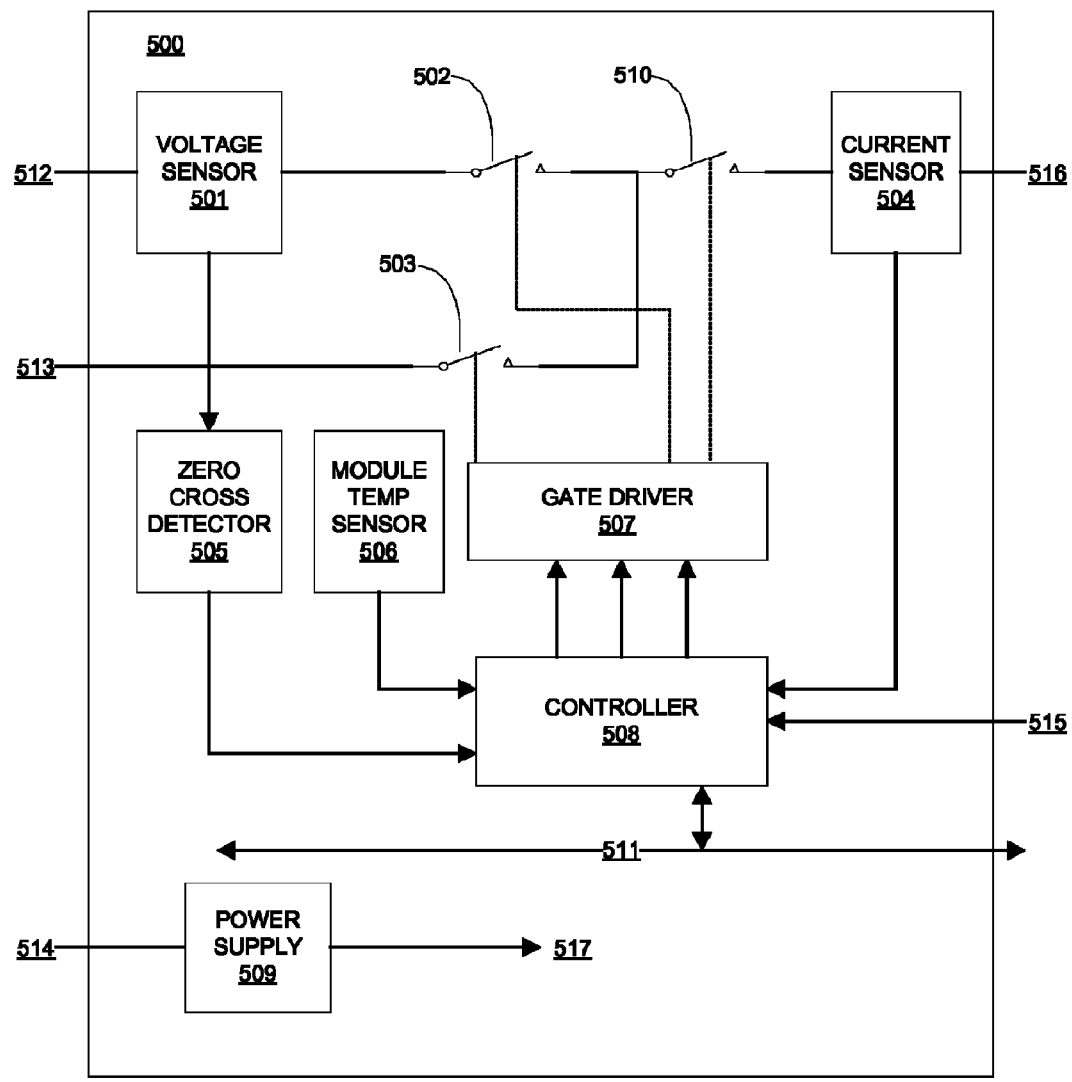
FIG. 5 illustrates an embodiment of an AC power distribution module.

FIG. 5 illustrates an embodiment of an AC power distribution module 500. AC power distribution module 500 may comprise any of AC power distribution modules 104A-D, 204A-D, or 304A-D. AC power distribution module 500 comprises two power switches 502 and 503. Switch 502 is connected to the main power bus (bus bars 103, 203, and 303 of FIGS. 1-3) by line 512, and switch 503 is connected to the soft start motor bus (bus bars 106, 206, and 306 of FIGS. 1-3) by line 513. Switch 503 is closed and switch 502 is open during soft start, while switch 502 is closed and switch 503 is open during normal motor operation. Some embodiments of AC power distribution module 500 further comprise switch 510, which is an optional switch that provides bidirectional protection for the system. Switches 502, 503, and 510 are controlled by gate driver 507, which is controlled by controller 508. Controller 508 receives communications from communications bus 110 of FIG. 1, communication bus 210 of FIG. 2, or communication bus 310 of FIG. 3 via communication bus 511, and controls gate driver 507 based on data from various motor sensors, including voltage sensor 501, zero cross detector 505, module temperature sensor 506, current sensor 504, and motor temperature input 515. The motor sensors comprising AC power distribution module 500 are powered by DC control power 514 and DC power supply 509. DC power supply 509 receives power from connection 514, which may be connected to line 111 of FIG. 1, line 211 of FIG. 2, or line 311 of FIG. 3 in various embodiments. DC power supply 509 powers the zero cross detector 505, module temperature sensor 506, gate driver 507, controller 508, and current sensor 504 via line 517. The embedded load current sensor 504 is used for short circuit, and i²t protection, and can be used for active current control during soft start. Additional protective functions include motor over temperature and power module over temperature protections. Switches 502, 503, and 510 may comprise MOSFETs in some embodiments. When embodied as power MOSFETs, a body diode of switch 502 may be aligned with a polarity that is opposite a polarity of a body diode of the switch 503. This arrangement provides fault tolerant capability in the AC power distribution module 500.

Figure 6:
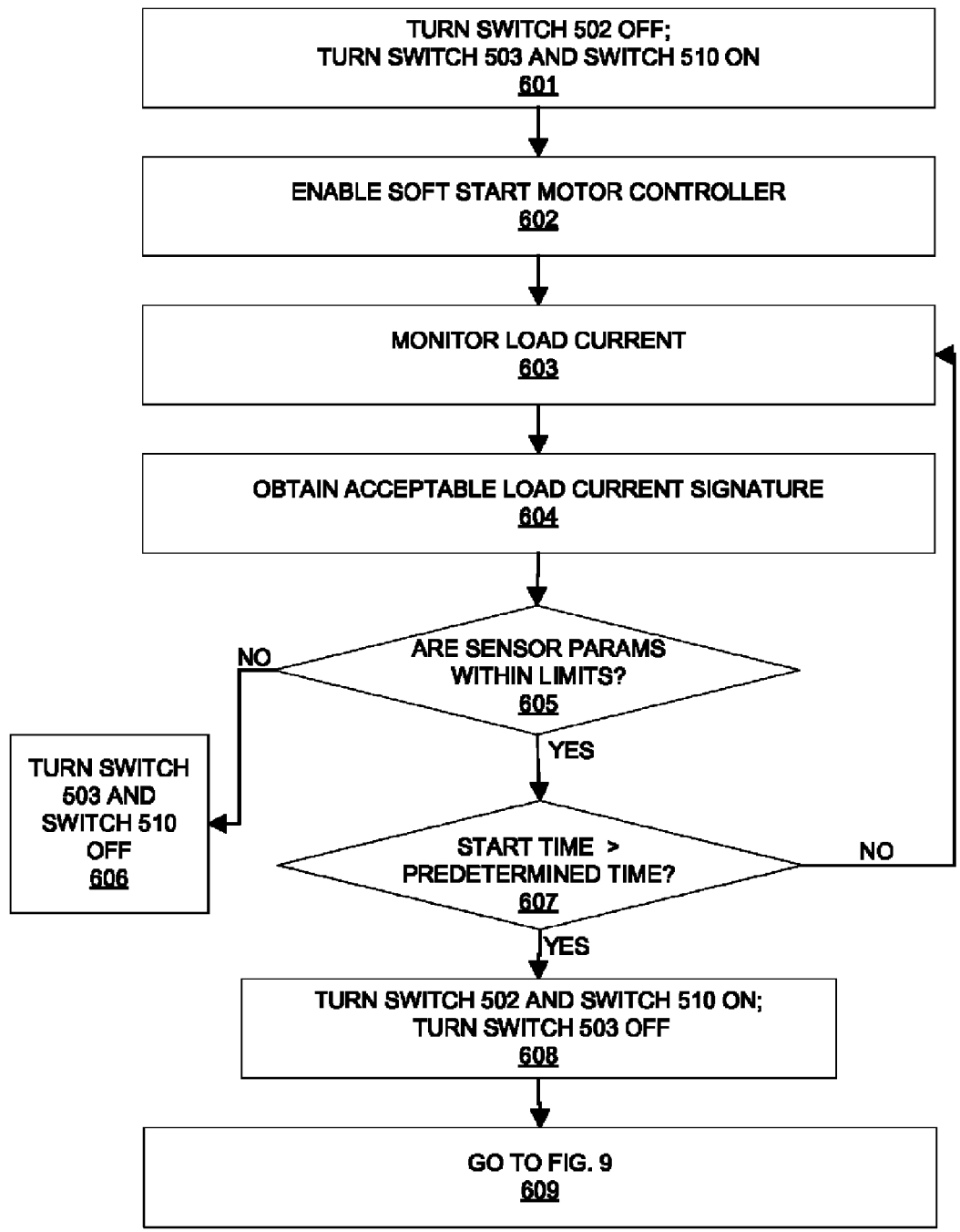
FIG. 6 illustrates an embodiment of a method of a start mode for an AC PDA comprising an SSPC.

FIG. 6 illustrates an embodiment of a method 600 of a start mode for an AC PDA 100 comprising an SSPC. FIG. 6 is discussed with respect to FIGS. 1 and 5. In block 601, switch 502 is turned off, and switch 503 is turned on in AC power distribution modules 104A-D. In embodiments comprising a switch 510, switch 510 is also turned on. In block 602, soft start controller 107 is enabled, and the AC switch with phase control located in soft start controller 107 is modulated to gradually increase the applied voltage to loads 105A-D. In block 603, the load current through soft start controller 107 and bus bar 106 is monitored. In block 604, an acceptable load current signature as a function of time and switching conditions is obtained, and the motor sensor parameters for AC PDA 100 are determined. The acceptable load current signature is different for the different AC loads, therefore, a reference acceptable load current signature may be identified for the individual AC loads 105A-D under various operating conditions and stored in the memory of controller 109 prior to soft start. In block 605, if the motor sensor parameters are determined to be outside of predetermined limits, flow proceeds to block 606, in which switch 503 is turned off and, in embodiments comprising switch 510, switch 510 is also turned off. If the motor sensor parameters are determined to be within the predetermined limits in block 605, flow proceeds to block 607. In block 607, it is determined if the start mode time is greater than a predetermined time (between about 7 and 10 seconds in some embodiments). If the start mode time is less than the predetermined time, flow returns to block 603. If the start mode time is determined to be greater than a predetermined time, then, in block 608, switch 503 is turned off, and switch 502 is turned on. Start mode ends, and flow then proceeds to normal operation, which is described in FIG. 9, in block 609.

Figure 7:
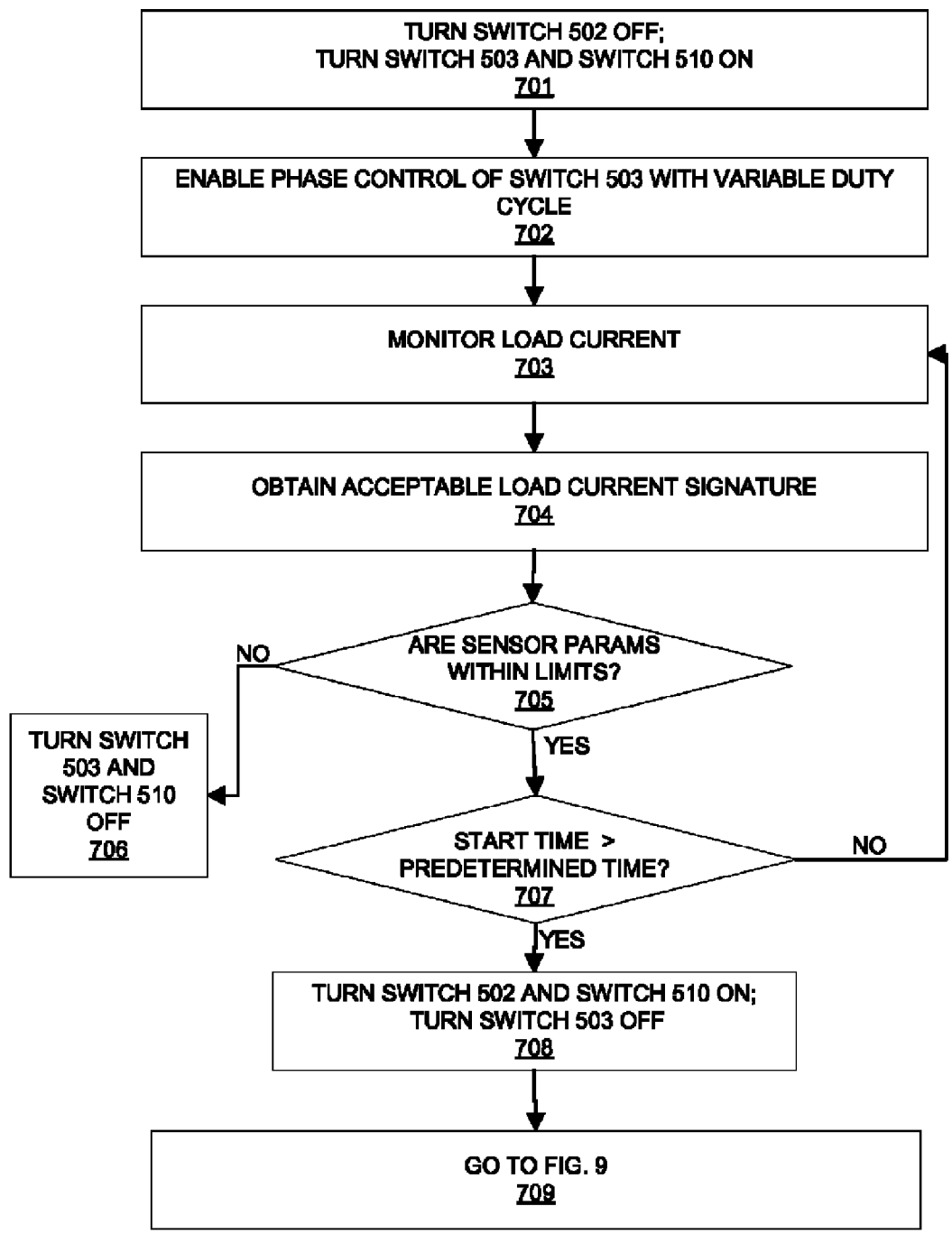
FIG. 7 illustrates an embodiment of a method of a start mode for an AC PDA comprising an SSPC.

FIG. 7 illustrates an embodiment of a method 700 of a start mode for an AC PDA 200 comprising an SSPC. FIG. 7 is discussed with respect to FIGS. 2 and 5. In block 701, switch 502 is turned off, and switch 503 is turned on in AC power distribution modules 204A-D. In embodiments comprising a switch 510, switch 510 is also turned on. In block 702, phase control of switch 503 by controller 209 is enabled. In block 703, the load current through filter 207 and bus bar 206 is monitored. In block 704, an acceptable load current signature as a function of time and switching conditions is obtained, and the motor sensor parameters for AC PDA 200 are determined. The acceptable load current signature is different for the different AC loads, therefore, a reference acceptable load current signature may be identified for the individual AC loads 205A-D under various operating conditions and stored in the memory of controller 209 prior to soft start. In block 705, if the motor sensor parameters are determined to be outside of predetermined limits, flow proceeds to block 706, in which switch 503 is turned off and, in embodiments comprising switch 510, switch 510 is also turned off. If the motor sensor parameters are determined to be within the predetermined limits in block 705, flow proceeds to block 707. In block 707, it is determined if the start mode time is greater than a predetermined time (between about 7 and 10 seconds in some embodiments). If the start mode time is less than the predetermined time, flow returns to block 703. If the start mode time is determined to be greater than a predetermined time, then, in block 708, switch 503 is turned off, and switch 502 is turned on. Start mode ends, and flow then proceeds to normal operation, which is described in FIG. 9, in block 709.

Figure 8:
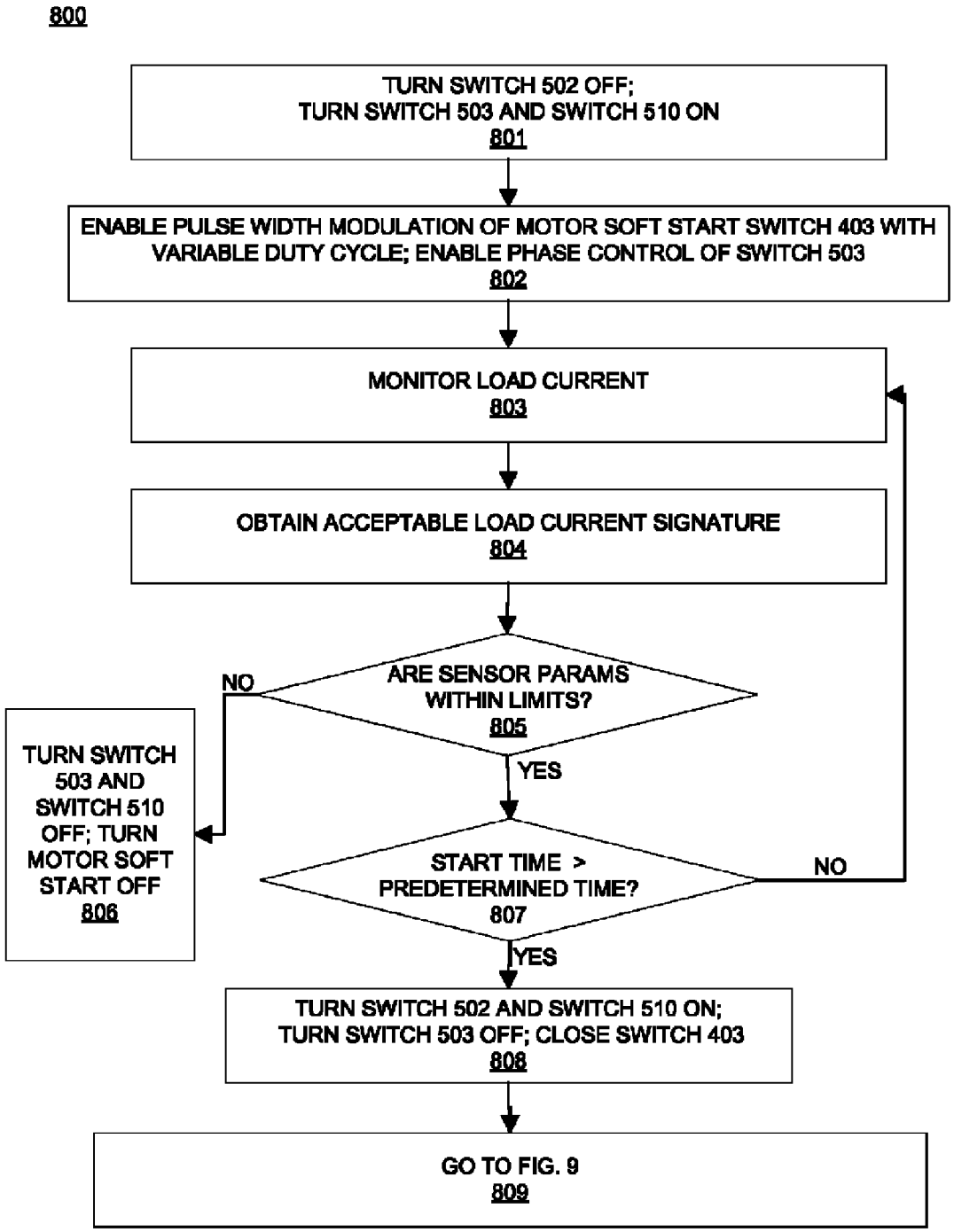
FIG. 8 illustrates an embodiment of a method of a start mode for an AC PDA comprising an SSPC.

FIG. 8 illustrates an embodiment of a method 800 of a start mode for an AC PDA 300 comprising an SSPC. FIG. 8 is discussed with respect to FIGS. 3, 4, and 5. In block 801, switch 502 is turned off, and switch 503 is turned on in AC power distribution modules 304A-D. In embodiments comprising a switch 510, switch 510 is also turned on. In block 802, pulse width modulation of soft start motor switch 403 in AC soft start motors 305A-D is enabled with variable duty cycle, and switch 503 is also enabled by controller 309. In block 803, the load current through filter 307 and bus bar 306 is monitored. In block 804, an acceptable load current signature as a function of time and switching conditions is obtained, and the motor sensor parameters for AC PDA 300 are determined. The acceptable load current signature is different for the different AC loads, therefore, a reference acceptable load current signature may be identified for the individual AC loads 305A-D under various operating conditions and stored in the memory of controller 309 prior to soft start. In block 805, if the motor sensor parameters are determined to be outside of predetermined limits, flow proceeds to block 806, in which switch 503 is turned off and, in embodiments comprising switch 510, switch 510 is also turned off. If the sensor parameters are determined to be within the predetermined limits in block 805, flow proceeds to block 807. In block 807, it is determined if the start mode time is greater than a predetermined time (between about 7 and 10 seconds in some embodiments). If the start mode time is less than the predetermined time, flow returns to block 803. If the start mode time is determined to be greater than a predetermined time, then, in block 808, switch 503 is turned off, and switch 502 is turned on. Modulation of soft start motor switch 403 ceases, and switch 403 remains closed to provide a neutral connection to each AC soft start motor 305A-D. Start mode ends, and flow then proceeds to normal operation, which is described in FIG. 9, in block 809.

Figure 9:
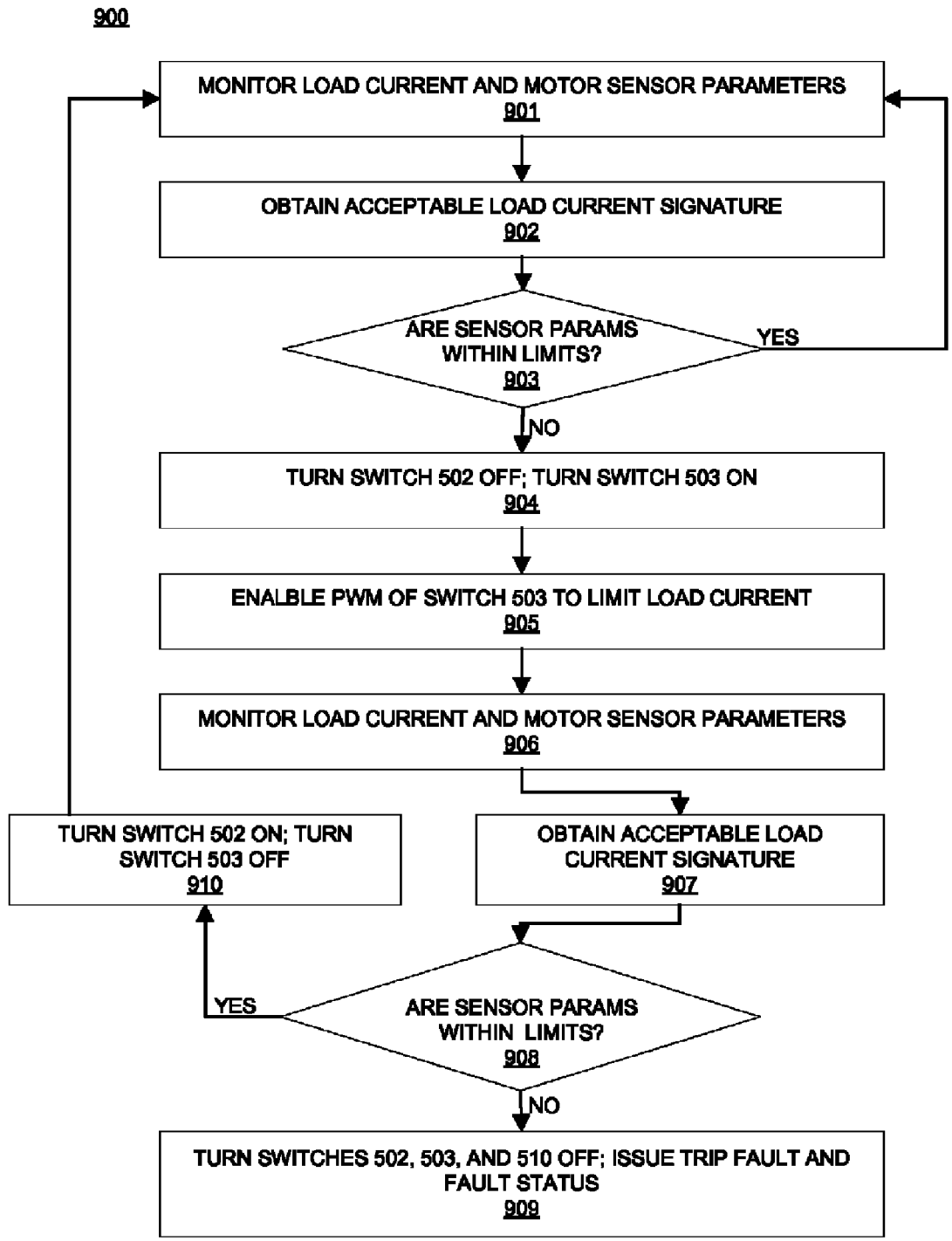
FIG. 9 illustrates an embodiment of a method of operating an AC PDA comprising an SSPC.

FIG. 9 illustrates an embodiment a method 900 of operating an AC PDA comprising an SSPC. FIG. 9 is discussed with respect to FIG. 5. In block 901, the load current, and motor and module temperatures in each AC power distribution module of the AC PDA are monitored. In block 902, an acceptable load current signature as a function of time, and motor and module temperatures is obtained. In block 903, it is determined if the motor sensor parameters are within predetermined limits. If the motor sensor parameters are within the predetermined limits, flow returns to block 901. If the parameters in any of the AC power distribution modules are not within the predetermined limits, switch 502 is turned off, and switch 503 is turned on in the particular AC power distribution module(s) in block 904. In block 905, switch 503 in the particular AC power distribution module(s) is pulse width modulated to limit the load current. In block 906, the load current, and motor and module temperatures in the AC PDA are monitored. In block 907, an acceptable load current signature as a function of time, and motor and module temperatures is obtained. In block 908, it is determined if the motor sensor parameters are within predetermined limits. If the parameters are within the predetermined limits, switch 502 is turned on and switch 503 is turned off in block 910, and flow returns to block 901. If the parameters in any of the AC power distribution module(s) are outside the predetermined limits, switches 502 and 503 in the particular AC power distribution module(s) are turned off in block 909, and a trip fault and fault status for the particular AC power distribution module(s) are issued. In embodiments comprising switch 510, switch 510 is also turned off. Method 900 reduces sensitivity to nuisance trips during detection of abnormal conditions by providing active current limiting in block 905, and then reevaluating the conditions in the ACPDA (100, 200, 300) before issuing a trip fault. Depending on conditions, only a particular AC power distribution module (104A-D, 204A-D, or 304A-D) connected to a particular load (105A-D, 205A-D, or 305A-D) may be tripped, or the master AC power distribution module (102, 202, 302) may be tripped.

The technical effects and benefits of exemplary embodiments include a relatively low cost and weight SSPC for an AC PDA.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating an alternating current (AC) power distribution assembly (PDA), wherein the ACPDA comprises a plurality of AC power distribution modules, each connected to a respective AC load, the method comprising:
   turning a first switch off and turning a second switch on in each of the AC power distribution modules;
   starting up each of the respective AC loads;
   monitoring a load current in the ACPDA and obtaining an acceptable load current in the ACPDA;
   determining if a set of motor sensor parameters for the ACPDA are within predetermined limits, and, in the event the motor sensor parameters are within the predetermined limits, determining if a startup period has elapsed; and
   in the event the startup period has elapsed, turning the first switch on and turning the second switch off in each of the AC power distribution modules.

2. The method of claim 1, wherein starting up each of the respective AC loads comprises enabling a soft start controller comprising a phase controlled AC switch that is configured to gradually increase the voltage applied to each of the respective AC loads.

3. The method of claim 1, wherein starting up each of the respective AC loads comprises enabling a filter that is connected to the second switch in each of the AC power distribution modules with a variable duty cycle.

4. The method of claim 1, wherein each of the respective AC loads comprises a respective soft start controller, and starting up each of the respective AC loads further comprises pulse width modulating a switch in each of the respective soft start controllers to gradually increase the voltage applied to each of the respective AC loads.

5. The method of claim 1, wherein each of the AC power distribution modules comprises a third switch, wherein the third switch is turned on when the first switch is turned off and the second switch is turned on in each of the AC power distribution modules; and wherein the third switch is turned on when the first switch is turned on and the second switch is turned off in each of the AC power distribution modules.

6. The method of claim 1, further comprising:
   monitoring the load current and the motor sensor parameters in each of the AC power distribution modules;
   determining if the motor sensor parameters in each of the AC power distribution modules are within the predetermined limits, and, in the event the motor sensor parameters in one or more of the AC power distribution modules are not within the predetermined limits:
   turning a first switch off and turning the second switch on in the one or more AC power distribution modules;
   pulse width modulating the second switch to limit the load current;
   monitoring the motor sensor parameters in the one or more of the AC power distribution modules; and
   determining if the motor sensor parameters are within the predetermined limits, and, in the event the motor sensor parameters are not within the predetermined limits, turning the second switch off in each of the one or more of the AC power distribution modules and issuing a trip fault.

7. The method of claim 6, wherein each of the AC power distribution modules comprises a third switch, wherein the third switch is turned on when the first switch is turned off and the second switch is turned on the one or more of the AC power distribution modules; and wherein the third switch is turned off when the trip fault is issued.

8. The method of claim 1, wherein the first and second switches comprise metal oxide semiconductor field effect transistors (MOSFETs).

9. An alternating current (AC) power distribution assembly (PDA), comprising:
   a master AC power distribution module; and
   a plurality of AC power distribution modules, each connected to a respective AC load, each of the plurality of AC power distribution modules comprising a first switch and a second switch, the first switch being connected to the master AC power distribution module, and the second switch being connected to a soft start controller;
   the ACPDA being configured to:
   turn the first switch off and turn the second switch on in each of the AC power distribution modules;
   start up each of the respective AC loads;
   monitor a load current in the ACPDA and obtain an acceptable load current in the ACPDA;
   determine if a set of motor sensor parameters for the ACPDA are within predetermined limits, and, in the event the motor sensor parameters are within the predetermined limits, determining if a startup period has elapsed; and
   in the event the startup period has elapsed, turn the first switch on and turn the second switch off in each of the AC power distribution modules.

10. The ACPDA of claim 9, wherein the soft start controller comprises a phase controlled AC switch that is configured to gradually increase the voltage applied to each of the respective AC loads.

11. The ACPDA of claim 9, each of the plurality of AC power distribution modules comprises a third switch that is turned on during the start mode.

12. The ACPDA of claim 9, wherein the first and second switches comprise metal oxide semiconductor field effect transistors (MOSFETs).

13. An alternating current (AC) power distribution assembly (PDA), comprising:

a master AC power distribution module; and
a plurality of AC power distribution modules, each connected to a respective AC load, each of the plurality of AC power distribution modules comprising a first switch and a second switch, the first switch being connected to the master AC power distribution module, and the second switch being connected to a filter;
the ACPDA being configured to:
  turn the first switch off and turn the second switch on in each of the AC power distribution modules;
  start up each of the respective AC loads;
  monitor a load current in the ACPDA and obtain an acceptable load current in the ACPDA;
  determine if a set of motor sensor parameters for the ACPDA are within predetermined limits, and, in the event the motor sensor parameters are within the predetermined limits, determining if a startup period has elapsed; and
  in the event the startup period has elapsed, turn the first switch on and turn the second switch off in each of the AC power distribution modules.

14. The ACPDA of claim 13, wherein the filter is configured to phase control the second switch in each of the AC power distribution modules with a variable duty cycle.

15. The ACPDA of claim 13, wherein each of the respective AC loads comprises a respective soft start controller configured to pulse width modulate a switch in each of the respective soft start controllers to gradually increase the voltage applied to each of the respective AC loads.

16. The ACPDA of claim 13, wherein the first and second switches comprise metal oxide semiconductor field effect transistors (MOSFETs).

\* \* \* \* \*